United States Patent [19]
Oliveira, II

[11] 4,101,871

[45] Jul. 18, 1978

[54] TOUCH-TONE ENCODER UNIT FOR MOBILE RADIO TRANSMITTER

[76] Inventor: Joseph P. Oliveira, II, 8060 Willoughby Ave., Hollywood, Calif. 90046

[21] Appl. No.: 752,203

[22] Filed: Dec. 20, 1976

[51] Int. Cl.² ............................................. H04M 1/50
[52] U.S. Cl. ............................ 340/171 R; 340/365 S; 179/90 K
[58] Field of Search ............... 340/365 S; 179/84 VF, 179/90 K; 361/412, 413, 414

[56] References Cited

U.S. PATENT DOCUMENTS

| | | | |
|---|---|---|---|
| 3,538,256 | 11/1970 | Lucas | 179/90 K |
| 3,970,801 | 7/1976 | Ross | 179/84 VF |
| 3,982,079 | 9/1976 | Hoehn | 179/90 K |
| 4,012,601 | 3/1977 | Kehren | 179/90 K |

OTHER PUBLICATIONS

Edwards, C., "Pocket Data Terminal," Jan. 76, Radio Electronics, pp. 29–31, 60, 61.

Primary Examiner—Harold I. Pitts
Attorney, Agent, or Firm—Keith D. Beecher

[57] ABSTRACT

A touch-tone encoder unit is provided for a mobile radio transmitter which is constructed as a single unitary package comprising a keyboard, a first printed circuit board positioned adjacent to the rear face of the keyboard which includes a switching circuit for providing connections from the individual pushbuttons of the keyboard to a row of connector pins on the first printed circuit board, a second printed circuit board containing the encoder circuit positioned adjacent to the first printed circuit board and electrically connected thereto by way of the connector pins which are received in connector holes in the second printed circuit board, and a housing attached to the keyboard and serving to sandwich the printed circuit boards between it and the keyboard in a unitary assembled condition.

4 Claims, 5 Drawing Figures

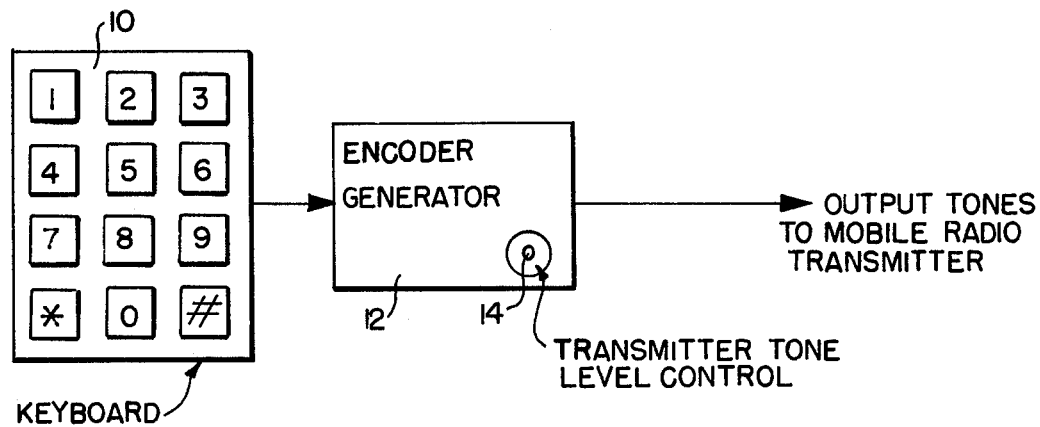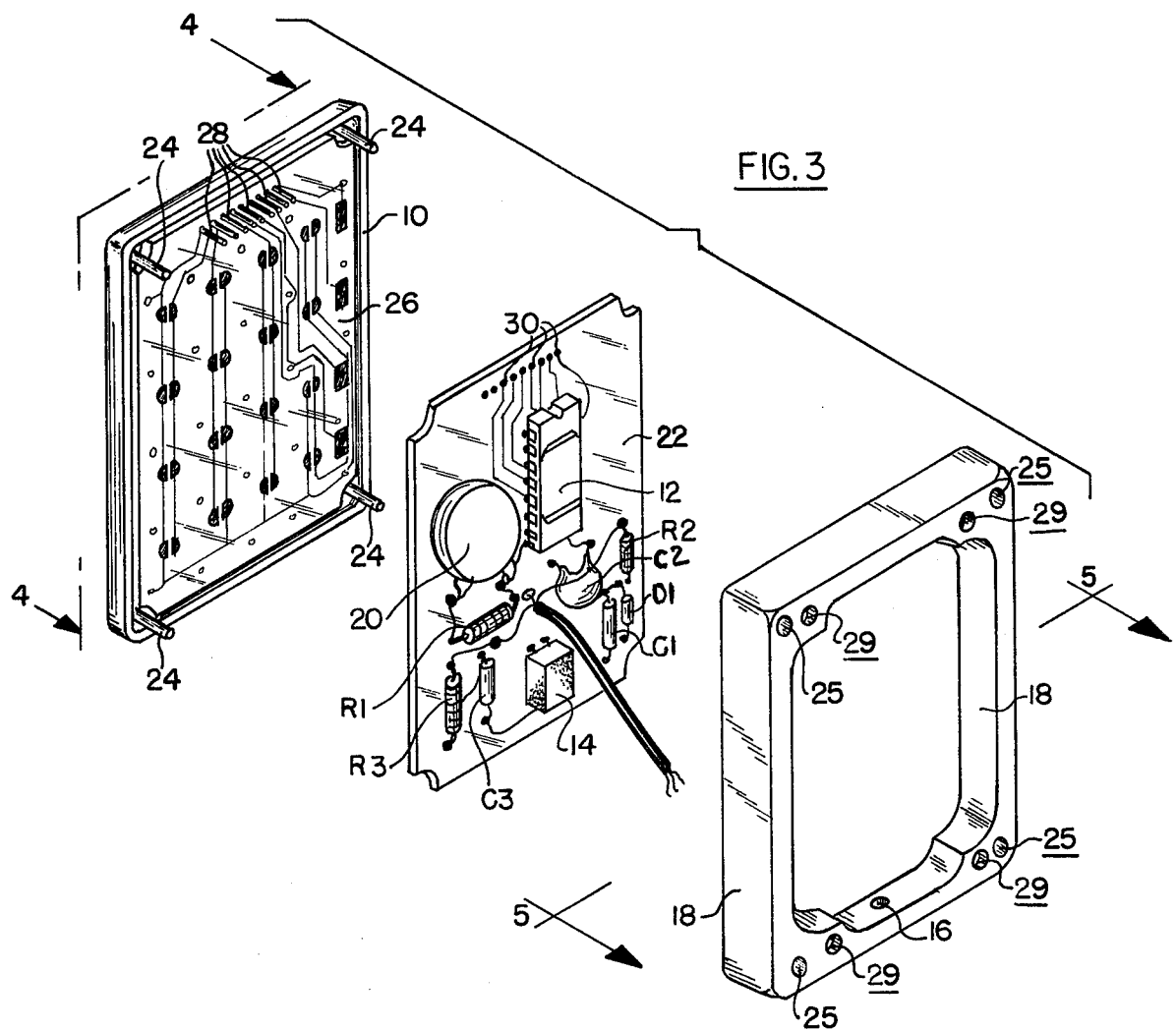

TOUCH-TONE ENCODER UNIT FOR MOBILE RADIO TRANSMITTER

RELATED COPENDING APPLICATIONS

Ser. No. 751,033 filed Dec. 16, 1976 and Ser. No. 750,440 filed Dec. 16, 1976.

BACKGROUND OF THE INVENTION

Two-way radio voice-communication systems have become extremely popular in recent years, and so much so that the usual prior art voice-communication systems are no longer adequate. Digital and tone signalling equipment are presently in widespread use to provide selective calling in present-day radio voice-communication systems, especially in circumstances where the radio system is interconnected to a telephone exchange. The "Touch-Tone" system developed by American Telephone and Telegraph Company for its telephone switching networks has proven to be adaptable to such radio voice-communication systems.

The usual Touch-Tone encoder is designed so that when a particular pushbutton on the keyboard is depressed, a pair of signalling tones is produced, with each tone being carefully selected to avoid the principal harmonics normally created in speech and music. Touch-Tone signalling has been adapted to radio communication, and has been used satisfactorily in prior art two-way radio voice-communcation systems.

The usual prior art Touch-Tone encoder unit for mobile radio transmitters includes a keyboard and an encoder generator circuit connected to the keyboard. The encoder generator circuit generates the two distinct tones whenever a particular pushbutton on the keyboard is depressed, and these tones serve to identify the particular pushbutton. The dual tones are transmitted by the mobile transmitter to the receivers in the system in which they are decoded. In this way, a call may be placed to a selected receiver by depressing a number of pushbuttons on the keyboard in a particular sequence, corresponding to the selected code for the particular receiver.

The keyboard-encoder unit of the present invention constitutes a useful commercial product which can be readily manufactured for sale at a relatively low price, and which can be easily mounted on a mobile radio transmitter to fulfill its intended function.

BRIEF DESCRIPTION OF THE DRAWINGS

FIG. 1 is a block diagram of a typical Touch-Tone encoder system for use in conjunction with a mobile radio transmitter;

FIG. 3 is an exploded perspective view of a keyboard-encoder unit constructed in accordance with one embodiment of the invention;

DETAILED DESCRIPTION OF THE ILLUSTRATED EMBODIMENT

Figure 2:
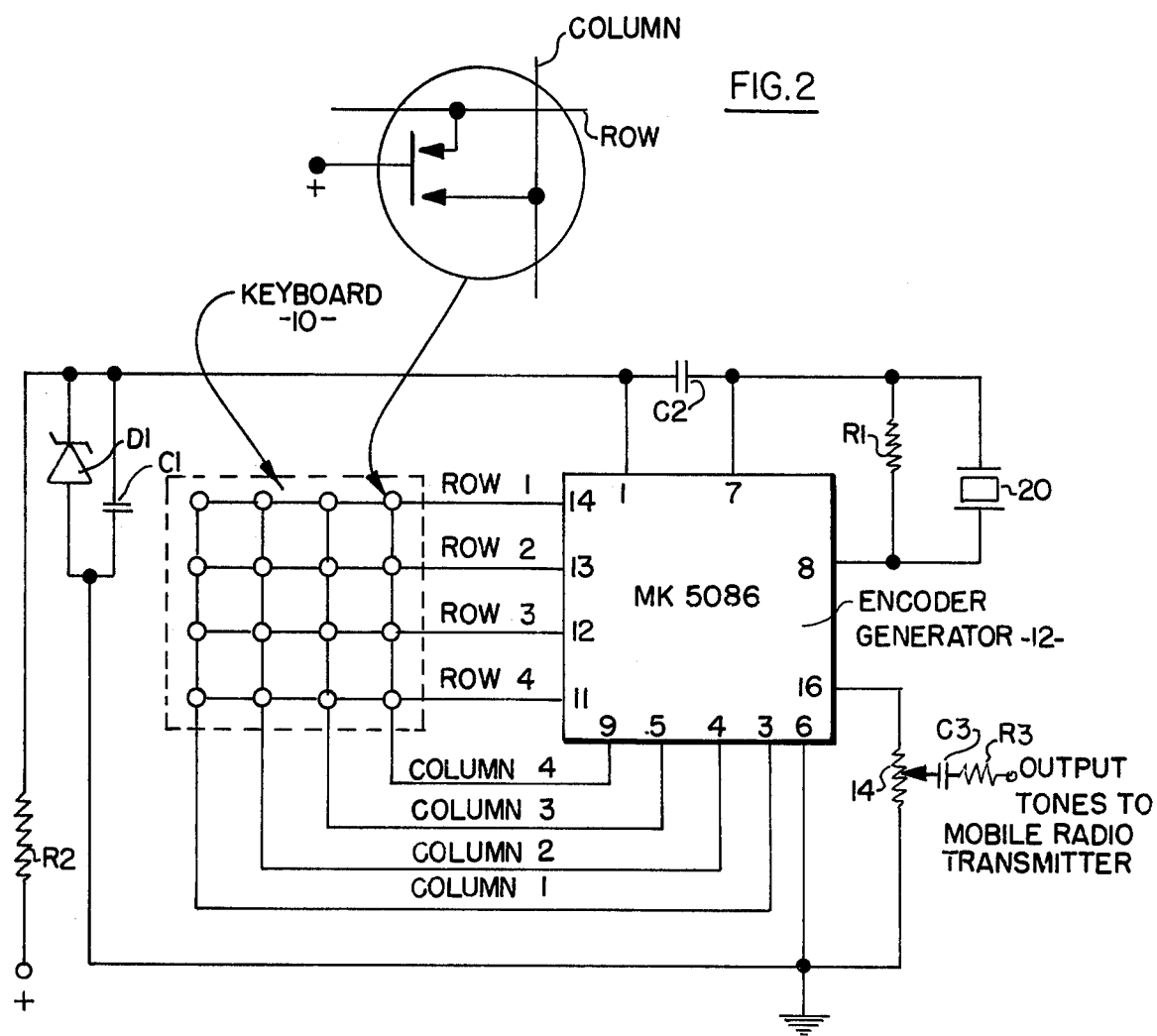
FIG. 2 is a more detailed schematic representation of the block diagram of FIG. 1.

The encoder system shown in FIG. 1 includes a keyboard 10. The keyboard may be a typical Touch-Tone keyboard which includes a multiplicity of appropriately identified pushbuttons which, when actuated, perform a switching function for an encoder generator circuit designated by block 12. The keyboard 10 may be of the type described in U.S. Pat. No. 2,800,104.

Whenever a particular pushbutton on keyboard 10 is operated, the encoder circuit 12 is caused to generate a pair of tone singals corresponding to the particular pushbutton. The encoder generator circuit is connected to a mobile transmitter, so that the dual tones generated by the encoder generator circuit may be transmitted to appropriate receiving equipment. The level of the dual tones applied to the transmitter can be controlled by a tone level control 14. The tone level control 14 is accessible through a hole 16 in a frame 18 (FIG. 3), and takes the form of a potentiometer.

As shown by the schematic diagram of FIG. 2, the encoder generator circuit 12 may be an integrated circuit, which is commercially available and which is designated as MK5086. The encoder generator circuit is stabilized by a crystal 20 which is shunted by a 10 megohm resistor R1. The crystal and resistor R1 are connected across pins 7 and 8 of the integrated circuit. Keyboard 10 is connected to pins 9, 5, 4, 3 and 11, 12, 13, 14 of the integrated circuit. Whenever a pushbutton on keyboard 10 is operated, a dual switching effect is created, so that the encoder generator circuit generates a pair of tones identifying the operated switch.

Pin 6 of the printed circuit 12 is grounded. Pin 1 is connected through a 300 ohm resistor R2 to the positive terminal of an appropriate energizing potential source. Pin 1 is also connected to a grounded 2.2 microfarad capacitor C1 which is shunted by a Zener diode D1. The positive potential source may have a value of 4.5 - 16 volts, and its negative terminal is grounded. Pins 1 and 7 of printed circuit 12 are shunted by a 10 picofarad capacitor C2. Pin 16 is connected to potentiometer 14 whose other side is grounded. The movable contact of potentiometer 14 is coupled through a 0.1 microfarad capacitor C3 and through a 51 kilo-ohm resistor R3 to the mobile transmitter.

Figure 4:
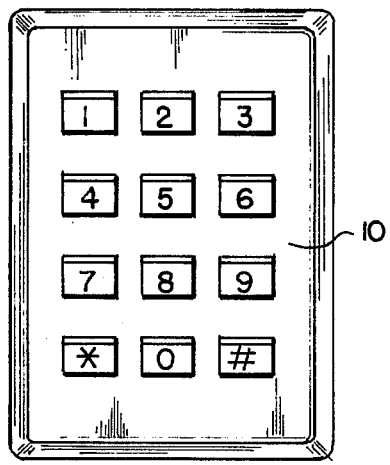
FIG. 4 is a view of the unit of FIG. 2, taken along the line 4—4 of FIG. 3.
Figure 5:
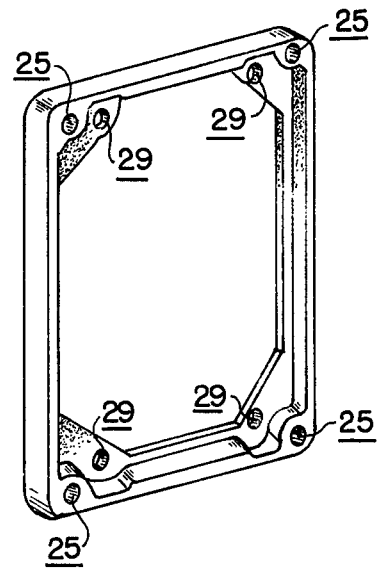
FIG. 5 is a view of the front of a component of the unit of FIG. 3 taken along the line 5—5 of FIG. 3.

One embodiment of the keyboard-encoder unit of the invention which serves to implement the circuit of FIG. 2 is shown in FIG. 3. As shown in FIG. 3, the various electronic components of the encoder circuit 12 are mounted on a printed circuit board 22 which, in turn, is supported between frame 18 and keyboard 10. As shown in FIG. 4, keyboard 10 forms the front face of the housing. Four legs 24 extend rearwardly from the four corners of keyboard 10. These legs are received in holes 25 in the frame 18, and they are glued in place to hold the unit in an assembled condition. Additional mounting holes 29 are provided in frame 18 which, as shown in FIG. 5, are displaced down from holes 29. This arrangement permits the frame to be mounted on a supporting surface either from the inside by passing screws through the holes 29 into the supporting surface before the keyboard 10 and circuit boards are mounted in the frame; or from the outside by passing screws through the supporting surface into holes 29 after the keyboard and circuit board are mounted on the frame.

A switching circuit board 26 is mounted on the rear side of the keyboard. A plurality of connector pins 28 extend rearwardly from circuit board 26. The switching circuit on circuit board 26 connects the pins to the various pushbuttons on keyboard 10, so that the appropriate dual switching function may be carried out whenever a pushbutton is actuated. This dual switching function is represented by the enlarged circled detail of the circuit of FIG. 2.

Thus, whenever a pushbutton on keyboard 10 is actuated, a dual switching function occurs, as shown in the circled detail section of FIG. 2, so that the encoder circuit 12 produces a pair of tone signals at its output pin 16, these tone signals being introduced to the mobile radio transmitter through the circuit C3, R3 at a level established by the setting of potentiometer 14.

The pins 28 are received in mating connector holes 30 in the encoder circuit board 22. In this way, appropriate connections may be made from the pushbuttons of keyboard 10 through the switching circuit on board 26 to the encoder circuit on the printed circuit board 22.

The invention provides, therefore, a simple and compact keyboard-encoder generator unit which incorporates a pair of printed circuit boards, one performing a switching function and the other forming the encoder circuit, the board being contained within a housing which is attached to the keyboard, and in which the keyboard forms an enclosure for the open front of the housing. The construction results in a simple and compact unit, which may be readily mounted on a mobile radio transmitter to perform its intended function.

It will be appreciated that although a particular embodiment of the invention has been shown and described, modifications may be made. It is intended in the following claims to cover all the modifications which come within the true spirit and scope of the invention.

What is claimed is:

1. A Touch-Tone encoder unit comprising: an open frame; a keyboard mounted on said frame and providing a closure for the front thereof; a switching circuit board mounted on said frame adjacent to the rear face of said keyboard in parallel relationship with said keyboard; a plurality of pushbuttons mounted on said keyboard and connected to said switching circuit board; a further circuit board mounted on said frame adjacent to said switching circuit board in parallel relationship therewith, one of said circuit boards having a plurality of connecting pins thereon, and the other of said circuit boards having a plurality of connecting holes therein to establish electrical connections between said switching circuit board and said further circuit board; and electrical components and circuitry constituting a Touch-Tone encoder generator circuit mounted on said further circuit board and controlled by said switching circuit board to generate selected dual tones upon the selective operation of said pushbutton switches.

2. The Touch-Tone encoder unit defined in claim 1, and which includes a plurality of mounting posts extending between the keyboard and the housing and secured thereto to hold the unit in an assembled condition.

3. The Touch-Tone encoder unit defined in claim 1, in which the electric components mounted on said further circuit board include at least one manually adjustable signal level control element, and in which said frame has a hole therein to permit manual adjustment of said control element.

4. The Touch-Tone encoder unit defined in claim 1, in which said frame has mounting holes therein displaced inwardly from the front side thereof to receive screws for mounting the frame on a supporting surface.

* * * * *